United States Patent [19]
Koba
[11] Patent Number: 4,922,978
[45] Date of Patent: May 8, 1990

[54] METHOD OF MENDING DEFECTIVE WOOD PLATE

[76] Inventor: Yoshinori Koba, c/o Meinan Machinery Works Inc., 3-130 Kajitacho Ohbushi Aichi Pref. 474, Japan

[21] Appl. No.: 168,609

[22] Filed: Mar. 8, 1988

Related U.S. Application Data

[63] Continuation of Ser. No. 855,589, Apr. 23, 1986, abandoned.

[30] Foreign Application Priority Data

Apr. 25, 1985 [JP] Japan .................................. 60-89459

[51] Int. Cl.[5] .......................... B27G 1/00; B32B 35/00
[52] U.S. Cl. ...................................... 144/332; 156/94; 264/36; 425/11
[58] Field of Search .......................... 264/36, 162, 267; 156/94; 144/332; 425/11, 13

[56] References Cited

U.S. PATENT DOCUMENTS 1,954,754 4/1934 Hartzell .............................. 144/332
2,536,665 1/1951 Skoog ................................. 144/332
2,770,556 11/1956 Grangaard et al. .................. 264/36
3,021,249 2/1962 Skoog .................................. 156/94
3,380,213 4/1968 Hartman et al. ...................... 264/36
3,547,170 12/1970 Maxey et al. ....................... 144/332
3,578,522 5/1971 Rauch .................................. 156/94
4,614,555 9/1986 Smith et al. .......................... 156/94

FOREIGN PATENT DOCUMENTS 65415 12/1969 Australia .................................. 80.9/
336517 11/1918 Fed. Rep. of Germany ......... 38 K/
0001596 1/1971 Japan ...................................... 156/94

*Primary Examiner*—Jan H. Silbaugh
*Assistant Examiner*—Karen D. Kutach
*Attorney, Agent, or Firm*—Lahive & Cockfield

[57] ABSTRACT

A method of mending a defective wood plate uses, instead of putty, a solid patching material which is smaller in thicknesswise shear strength and compressive strength than the wood plate and is sized greater than a defect of the plate which is to be mended. The solid patching material is applied to the plate in such a manner as to cover the defect and then compressed in the thicknesswise direction to undergo shear fracture. As a result, that part of the material which overlies the defect is thrust into the defect. The compression is effected in two consecutive stages, one using a rigid member and the other an elastic member. The part of the material filled in the defect is separated from the other part which remains on the plate. Where this method is applied to plywood production, the material will be forced into the defect without resorting to an extra compression step while the plate is being bonded to another.

8 Claims, 4 Drawing Sheets

METHOD OF MENDING DEFECTIVE WOOD PLATE

This application is a continuation of application Ser. No. 855,589, filed Apr. 23, 1986, now abandoned.

BACKGROUND OF THE INVENTION

The present invention relates to a method of mending knotholes, chips, cracks and other defects which appear on the surface of a wood plate such as a veneer or a plywood.

The traditional method of mending defects of the kind described is applying putty to defective portions by use of a pallet. The use of putty, however, entails various problems because it contains water or a like solvent therein. Specifically, where wood plates mended with putty are sequentially stacked one upon another, the putty applied to the surface of the underlying plate adheres to the overlying plate because putty which contains a solvent as stated above is highly adhesive. As the plates are pulled out one by one out of the stack in the subsequent step, that part of the putty on the underlying plate which has adhered to the overlying plate is taken away by the latter and, as a result, the putty filling the defects of the underlying plate becomes short to thereby fail to sufficiently plug up the defects.

Another problem given rise to by the solvent is that in the atmosphere the solvent is allowed to vaporize to increase the viscosity and thereby change the physical property of the putty. One, therefore, has to supply a supplementary amount of solvent from time to time for maintaining adequate viscosity, resulting in troublesome maintenance. Still another problem is that as the solvent vaporizes and dries out, clearances are produced between putty and the walls of the defects due to resultant shrinkage. Should a clearance develop in an intermediate sheet of a plywood, for example, it would be visible through the nearby plates to degrade the appearance of the whole plywood.

In addition, where putty which is fluid is filled in a knothole or like defect of a veneer which extends over the whole thickness of the veneer, it flows out of the defect by gravity failing to fully plug up the defect.

SUMMARY OF THE INVENTION

It is therefore an object of the present invention to eliminate the drawbacks inherent in the prior art method and provide a method which is capable of fully patching defects of a wood plate without resorting to putty, which has various drawbacks as discussed above.

It is another object of the present invention to provide a generally improved method of mending a defective wood plate.

In accordance with a method of the present invention, a solid patching material is used which is smaller in thicknesswise shear strength and compressive strength than a defective wood plate and is sized greater than a defect of the wood plate which is to be mended. The patching material is applied to the plate in such a manner as to cover the defect and, then compressed in the thicknesswise direction to undergo shear fracture. As a result, that part of the material which overlies the defect of the plate is forced into the defect to plug it up.

BRIEF DESCRIPTION OF THE DRAWINGS

The above and other objects, features and advantages of the present invention will become more apparent from a consideration of the following detailed description taken in conjunction with the accompanying drawings in which.

DESCRIPTION OF THE PREFERRED EMBODIMENTS

It should be borne in mind that in all the embodiments which will be described the term "wood plate" refers to a veneer, a plywood, a sawed plate and other various kinds of plates of wood, while the term "a solid patching material" refers to a piece of balsa, cork, husks of common millet, hard polyurethane foam (W-100) or the like which has relatively low shear strength in one direction. Further, compression in the thicknesswise direction covers all the possible compressing means as typified by rollers, presses and steel belts. For convenience, the following description will be made assuming a veneer as the wood plate and a piece of balsa as the patching material.

Figure 1:
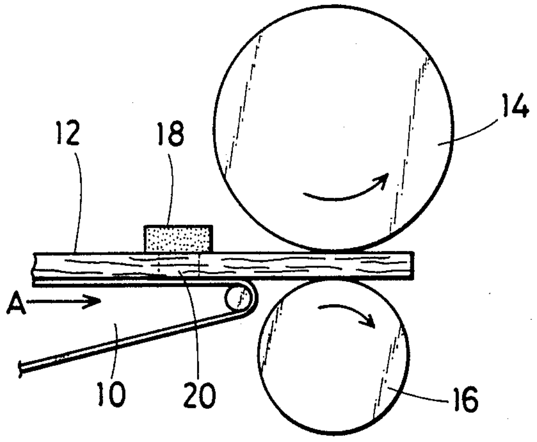
FIG. 1 is an elevation showing a specific construction for practicing the method of the present invention.

Referring to FIG. 1 of the drawings, a first specific construction for practicing the method of the present invention is shown. The construction includes a conveyor 10 adapted to transport a veneer 12 in a direction indicated by an arrow A. A pair of rollers 14 and 16 are situated adjacent to and downstream of the conveyor 10 with respect to the direction A. The rollers 14 and 16 are rotatable as indicated by arrows driven by a drive mechanism (not shown), and are made of metal such as iron. The rigid rollers 14 and 16 are spaced from each other by a distance which is equal to or slightly smaller than the thickness of the veneer 12.

A piece of patching material 18 is placed on the veneer 12 in order to fill up a knothole or like defect 20 of the veneer 12, as described hereinafter in greater detail. The patching piece, or patch, 18 is produced by cutting a blank of balsa parallel to its cut ends and, then, cutting the resulting piece to such dimensions that the cut ends are each greater than a defect to be plugged up and its thickness is substantially equal to that of the veneer 12. Generally, wood has relatively great strength along fibers thereof, but the coupling of fibers is relatively weak in a direction perpendicular to the fibers. Such nature of wood is especially prominent with balsa; the shear strength of balsa in the direction of fibers is lower than the thicknesswise shear strength of a veneer and, in addition, the compressive strength in the direction of fibers is lower than the thicknesswise compressive strength of a veneer. Hence, with respect to defects of ordinary dimensions, which usually exist in veneers for plywoods, balsa mending material will undergo shear fracture and then compression fracture. For this reason, balsa is the most desirable solid patching material.

Figure 2:
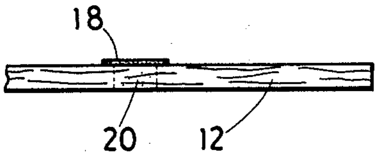
FIG. 2 is an elevation of a patching material which is partly compressed into a through defect of a wood plate by the construction of FIG. 1.

In operation, the veneer 12 having the naturally occurring defect 20 is laid on the conveyor 10 such that its fibers extend substantially in the direction of transport A. Then, the patch 18, made of balsa as previously stated, is manually placed on the veneer 12 to cover the defect 20 and in such orientation that the fibers of the patch 18 extend substantially perpendicular to those of the veneer 12. The conveyor 10 is driven to transport the veneer 12 and patch 18 in the direction A toward the rollers 14 and 16. As the rollers 14 and 16 compress the veneer 12 and patch 18 in the thicknesswise direction, shear fracture occurs between that part of the patch 18 which just overlies the defect 20 (hereinafter referred to as substantially the central part) and the other part of the patch 18 (referred to as the peripheral part) with the result that substantially the central part slips into the defect 20 to stop it up, as shown in FIG. 2. It will be seen that since only substantially the central part of the patch 18 which overlies the defect 20 is forced into the defect 20, it will not slip out of the defect 20 unless subjected to extraordinary forces.

The peripheral part of the patch 18 which is located outside the contour of the defect 20 is crushed flat by the rollers 14 and 16 remains on the surface of the veneer in a thin configuration around the defect 20. In practice, despite the presence of the peripheral part of the patch 20, the veneer 12 can be bonded with adhesive to another veneer to produce a plywood.

As described above, this particular embodiment of the present invention eliminates the need for putty having viscosity otherwise used to fill up defects of a wood plate. Veneers mended in accordance with this specific construction can be sequentially stacked without adhering to each other. Further, the patching material does not contain any solvent and, therefore, does not need any viscosity adjustment or invite degradation of appearance otherwise caused by shrinkage.

Figure 3:
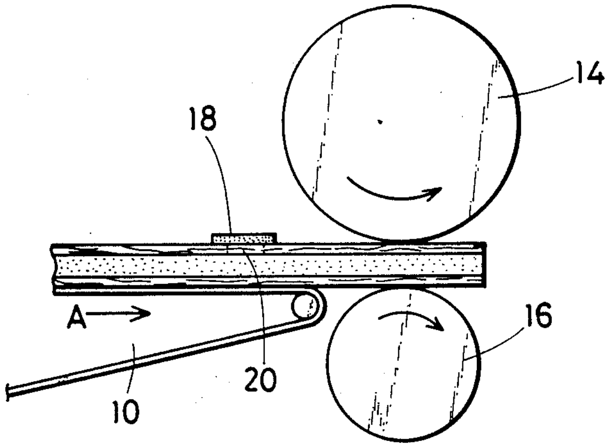
FIG. 3 is a view similar to FIG. 1, showing the patching material which is applied to a non-through defect of a wood plate.

While the thickness of the patch 18 should preferably be substantially the same as the veneer 12, it may be greater or smaller than the letter. The method in accordance with the illustrative embodiment, as well as others which will be described, is applicable not only to knotholes, splits and other defects which extend entirely through the veneer 12 but also to such defects which do not extend entirely therethrough such as those appearing on the surface of the veneer 12 as shown in FIG. 3. Further, adhesive may be applied to the bottom and/or other inner surfaces of the defect 20 and/or the bottom of the patch 18.

While the gap between the rollers 14 and 16 may be suitably dimensioned, it is desirable that it does not cause the veneer 12 to undergo plastic deformation due to compression. If desired, the rollers 14 and 16 which serve as pressing means may be replaced with steel belts or the like.

Now, in the specific construction of FIGS. 1 to 3, while the rollers 14 and 16, which are rigid, deform the peripheral part of the patch 18 by compression, the peripheral part of the patch 18 remains on the veneer 12 with some degree of thickness, and causes the surface of the veneer 12 around the defect 20 to undergo plastic deformation by an amount complementary to the thickness of the peripheral part of the patch 18. This deformed portion of the veneer 12 is undesirably left as a recess in the veneer 12. Such an occurrence may be eliminated by employing two consecutive stages of compression, i.e., preliminary compression using rigid members and regular compression using a resilient member, as will be described with reference to FIG. 4.

Figure 4:
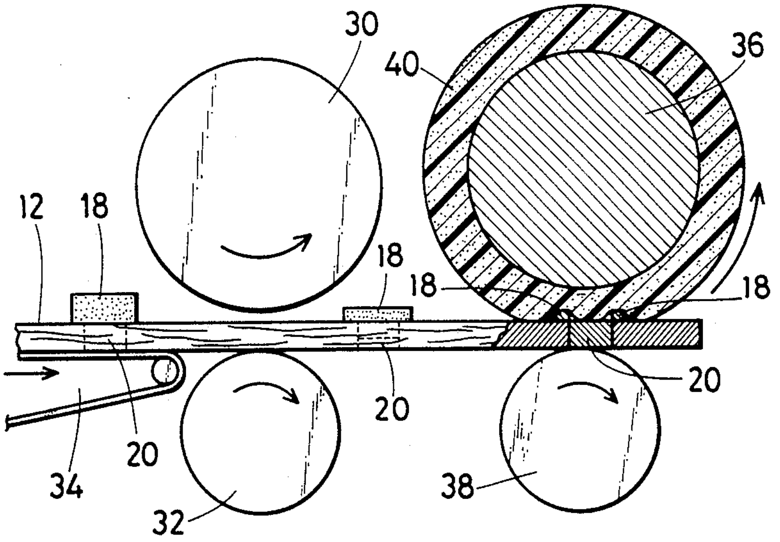
FIG. 4 is a partly sectional elevation showing another specific construction for practicing the method of the present invention.

Referring to FIG. 4, another specific construction in accordance with the present invention is shown which allows a minimum of plastic deformation to occur in the veneer 12 around the defect 20 for the above purpose. A pair of rigid rollers 30 and 32 are located downstream of a conveyor 34 with respect to the direction A, the conveyor 34 corresponding to the conveyor 10 of FIGS. 1 and 3. An elastic roller 36 and a rigid roller 38 are disposed downstream of the rollers 30 and 32 with respect to the direction A, the roller 36 above the roller 38. The outer periphery of the roller 36 is covered with a rubber layer 40. The rollers 30 and 32 are spaced from each other by a distance which is greater than the thickness of the veneer 12 but smaller than the total thickness of the patch 18 and veneer 12. The rollers 36 and 38, on the other hand, are spaced from each other by a distance which is substantially equal to or slightly smaller than the thickness of the veneer 12.

The patching operation with the arrangement of FIG. 4 is as follows. While the conveyor 34 is driven by a drive mechanism, not shown, the patch 18 made of balsa is laid on the defect 20 of the veneer 12 by hand. As the patch 18 is compressed by the rollers 30 and 32, which are rotating as indicated by arrows, shear fracture occurs between substantially the central part of the patch 18 which corresponds in shape to the defect 20 and the peripheral part for the reason which has been stated in relation to the embodiment of FIGS. 1 and 2. As a result, the central part of the patch 18 slips into the defect 20. However, at this stage of compression the patch 18 does not plug up the defect 20 over the entire width of the veneer 12 due to the substantial gap between the rollers 30 and 32, as represented by the intermediate patch 18 in FIG. 4. Meanwhile, the peripheral part of the patch 18 surrounding the half-buried central part is compressed by a weaker force than in the embodiment of FIGS. 1 and 2 and, therefore, prevents the surface of the veneer 12 from being plastically deformed. As the veneer 12 is further transported, the patch 18 on the veneer 12 is compressed by the elastic roller 36 and the rigid roller 38. At this instant, the half-buried central area of the patch 18, which has already been fractured by the rigid rollers 30 and 32, is fully and smoothly pressed into the defect 20 by a force of the rubber layer 40 of the roller 36 which is relatively weak. In the meantime, the peripheral part of the patch 18, although it is also compressed by the rubber layer 40, is prevented from being excessively compressed partly because the compressing force is relatively weak and because the rubber layer 40 itself is deformable. Hence, the area of the veneer 12 which surrounds the defect 20 is free from plastic deformation.

As discussed above, the embodiment of FIG. 4 has an advantage that it safeguards the area of the veneer 12 which surrounds the defect 20 against plastic deformation, in addition to the advantages attainable with the embodiment of FIGS. 1 and 2.

Figure 5:
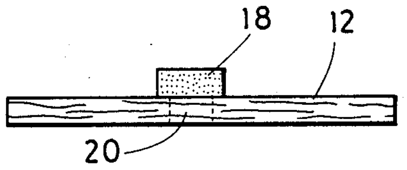
FIGS. 5 and 6 are views showing another specific construction for practicing the method of the present invention.
Figure 6:
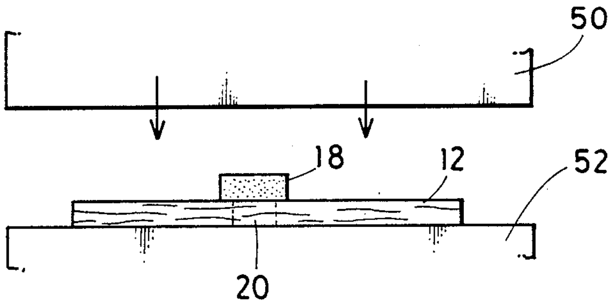

Referring to FIGS. 5 and 6, another specific construction for practicing the method of the present invention is shown in which the pressing means is implemented not by rollers but by a hot press, a cold press or like pressing mechanism. As shown in FIG. 5, the patch 18 is applied to the veneer 12 to cover the defect 20. Then, as shown in FIG. 6, the patch 18 is compressed by a press in a direction indicated by arrows. In this particular embodiment, the press comprises a cold press which consists of an upper section 50 and a lower section 52. It will be seen that since the veneer 12 and the patch 18 are compressed together by the press without being transported, the patch 18 is prevented from being dislocated relative to the veneer 12. A press is especially advantageously applicable to a production line where a plurality of defects of a veneer are patched at the same time.

In the foregoing embodiments, substantially the central part of the patch 18 which is pressed into the defect 20 of the veneer 12 and the peripheral part of the same are not completely separated from each other and are left with their tissues entangled along their boundary. Concerning the production of a plywood. such a veneer 12 will be bonded to another together with the peripheral parts of the patches 18 which remain on the surfaces of the veneers 12. It is more desirable, however, that the peripheral parts of the patches 18 be removed from the standpoint of quality of plywoods.

Figure 7:
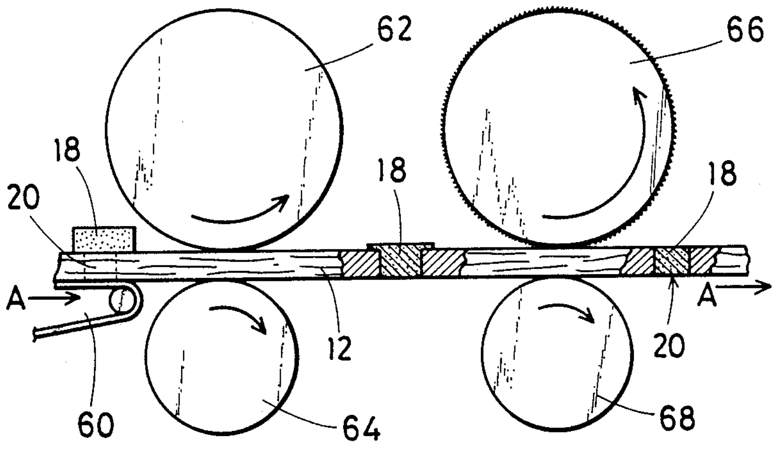
FIGS. 7 and 8 are elevations each showing another specific construction for practicing the method of the present invention.

Referring to FIG. 7, another specific construction for practicing the method of the present invention is shown which includes an implementation for removing the peripheral part of the patch 18 from the veneer 12. As shown, the arrangement of FIG. 7 includes a conveyor 60 adapted to transport the veneer 12 as indicated by the arrow A, and a pair of rigid rollers 62 and 64 located adjacent to the outlet end of the conveyor 60. Since the conveyor 60 and the rollers 62 and 64 correspond to the conveyor 10 and the rollers 14 and 16 of FIG. 1, their detailed description will be omitted to avoid redundancy. In this particular embodiment, another pair of rollers 66 and 68 are situated downstream of the rollers 62 and 64 with respect to the direction A. The roller 66 is provided with a sandpaper on the outer periphery thereof. The rollers 66 and 68 as well as the rollers 62 and 64 are each rotatable, as indicated by an arrow and driven by a drive mechanism, not shown. The peripheral speed of the roller 66 is predetermined to be higher than the transport speed of the veneer 12.

In operation, the patch 18, which may be made of balsa as in the foregoing embodiments, is placed on the defect 20 of the veneer 12 which is transported by the conveyor 60. First, the patch 18 is compressed by the rollers 62 and 64 so that only substantially the central part of the patch 18 which is aligned with the defect 20 is forced into the defect 20. However, as previously stated, the central and the peripheral parts of the patch 18 are kept physically interconnected on the veneer surface by their fine tissues even after they are compressed by the rollers 62 and 64, even though the patch 18 may be thicker than, as thick as, or thinner than the veneer 12. As the veneer 12 is further transported by the conveyor 60, the peripheral part of the patch 18 which protrudes from the veneer surface is shaved off by the sandpaper on the roller 66 which cooperates with the roller 68. As a result, the patch 18 received in the defect 20 is provided with substantially the same thickness as the veneer 12.

As described above, the embodiment of FIG. 7 effectively removes the peripheral part of the patch 18 from the central part which is forced into the defect 20, while further securely forcing the patch 18 into the defect 20. In addition, it is needless for the patch 18 to be machined beforehand to a thickness which is equal to the defect 20.

The shaving rollers 66 and 68 may be replaced with an ordinary sander or a buffing machine. The sandpaper is also applicable to the elastic roller 36 of FIG. 4 in order to fulfill the pressing and the shaving functions at the same time by a single member, in which case, too, the roller 36 will be rotated at a peripheral speed which is higher than the veneer transport speed.

Figure 8:
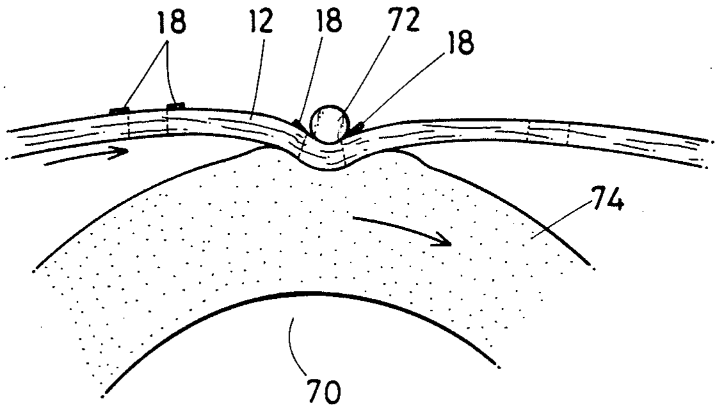

Referring to FIG. 8, another embodiment of the present invention is shown which also includes means for removing the peripheral part of the patch 18 from the veneer surface. As shown, a pair of rollers 70 and 72 are rotatable as indicated by arrows, and are driven by a drive mechanism, not shown. The roller 70 is greater in diameter than the roller 72 and held in light contact with the roller 72. While the roller 72 is rigid, the roller 70 is covered with a layer of elastic material 74 such as rubber. In this construction, while the rollers 70 and 72 are rotated, the veneer 12 is moved therethrough so that the peripheral part and the buried central part of the patch 18 are broken apart from each other due to elastic deformation of the roller 70.

Figure 9:
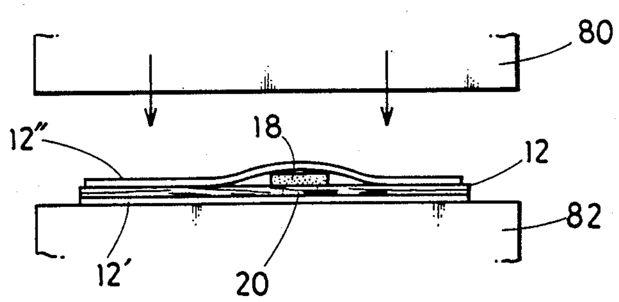
FIGS. 9 and 10 are elevations showing another specific construction for practicing the method of the present invention.
Figure 10:
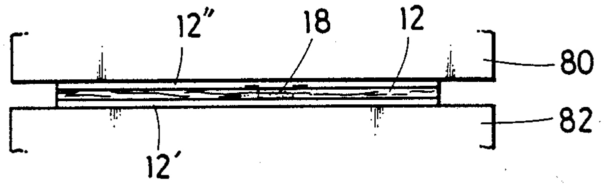

Referring to FIGS. 9 and 10, another specific construction for practicing the method of the present invention is shown. Briefly, this particular embodiment is applied to a plywood production line which uses a cold press or a hot press, so that the patch 18 may be forced into the defect 20 without resorting to an extra compression step while the veneer 12 is bonded to other veneers or like plates. As shown, a press which comprises a hot press in this particular embodiment is made up of an upper section 80 and a lower section 82, as well known in the art. A veneer 12' is laid on the lower press section 82, while the veneer 12 with the patch 18 positioned on the defect 20 is laid on the veneer 12'. Another veneer 12'' is laid on the defective veneer 12. Adhesive is applied beforehand to opposite major surfaces of the veneer 12, which serves as a core in the illustrative laminate. The manner of positioning the patch 18 on the veneer 12 is assumed to be the same as that shown in FIG. 5. As the press is driven to compress the laminate of the three veneer 12, 12' and 12'' as in the ordinary plywood production line, the patch 18 is automatically forced by the press through the overlying veneer 12''. As a result, as in any of the foregoing embodiments, only the substantially central part of the patch 18 which is aligned with the defect 20 is thrust into the defect 20, as shown in FIG. 10, the peripheral part being deformed by compression between the veneers 12 and 12''.

In this particular embodiment, the veneers 12' and 12'' are simply typical examples of various kinds of plate-like bodies and may even be replaced with sheets of vinyl chloride, for example. Further, the bonding step described above covers all the kinds of bonding steps heretofore known in the art in which adhesive is applied to at least one of plate-like bodies and, then, the bodies are stacked and compressed.

As described above, the specific embodiment of FIGS. 9 and 10 is capable of patching the defect 20 of the veneer 12 utilizing a pressing step which is essential in the production of a plywood. Such simplified the procedure for mending the defective veneer 12.

Although the press in the embodiment of FIGS. 9 and 10 is implemented with a hot press, it may of course be comprised of a cold press. Also, this particular embodiment is applicable not only to the three-ply bonding step shown and described but also to five-ply and any other bonding steps so long as three or more plate-like members are used.

Figure 11:
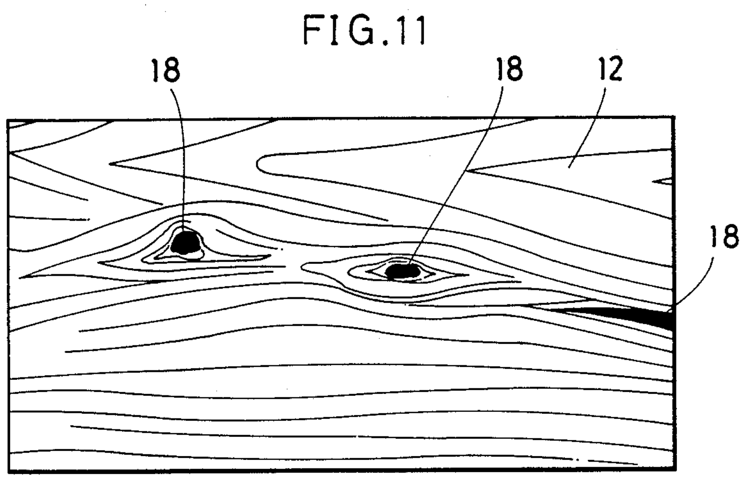
FIG. 11 shows a wood plate which has been mended by any of the specific constructions shown in FIGS. 1–10.

In any of the foregoing embodiments, the patch 18 which is thrusted into the defect 20 of the veneer 12 may be colored to suitably match it to a particular configuration of the defect 20. For example, as shown in FIG. 11, the patch 18 if it is a knothole may be colored in black and if it is a chip or a crack, in light brown. Then, even if such patched sections of the veneer 12 were visible, they would not appear unnatural and, therefore, not degrade the appearance at all.

In summary, it will be seen that the present invention provides a method of mending a defective wood plate which successfully plugs up knotholes, chips, cracks and other defects of a wood plate without resorting to putty.

Various modifications will become possible for those skilled in the art after receiving the teachings of the present disclosure without departing from the scope thereof.

What is claimed is:

1. A method of patching a naturally occurring defect having a periphery in a wood plate having a surface comprising the steps of:

a. preparing a solid patching material which is smaller in thicknesswise shear strength and compressive strength than the wood plate and is sized to extend beyond the periphery of the defect of the wood plate which is to be mended;
b. applying the solid patching material to the wood plate in such a manner as to cover the defect; and
c. compressing the solid patching material in a thicknesswise direction thereof to cause the patching material to undergo shear fracture along the periphery of the defect so that a central portion of the patching material lying over the defect is thrust into the defect while another part of the patching material, lying outside of the periphery of the defect and outside of the central portion of the patching material, remains above the surface of the wood plate and outside of the defect.

2. A method as claimed in claim 1, wherein the patching material has substantially the same thickness as the wood plate.

3. A method as claimed in claim 1, wherein step (c) comprises (d) first compressing the patching material by a rigid member and then (e) compressing the patching material by an elastic member.

4. A method of patching a naturally occurring defect having a periphery in a wood plate having a surface comprising the steps of:

a. preparing a solid patching material which is smaller in thicknesswise shear strength and compressive strength than the wood plate and extends beyond the periphery of the defect of the wood plate which is to be mended;
b. applying the solid patching material to the wood plate in such a manner as to cover the defect;
c. compressing the solid patching material in a thicknesswise direction thereof to cause the patching material to undergo shear fracture along the periphery of the defect so as to thrust a central portion of the patching material lying over the defect into the defect while compressing another part of the patching material lying outside of the periphery of the defect and outside of the central portion of the patching material, into a thin configuration above the surface of the wood plate and outside of the defect; and
d. separating the central portion of the solid patching material which has been thrust into the defect from the compressed part of the patching material, lying outside of the periphery of the defect and outside of the central portion of the patching material which has not been thrust into the defect.

5. A method as claimed in claim 4, wherein the patching material has substantially the same thickness as the wood plate.

6. A method as claimed in claim 4, wherein step (c) comprises (d) first compressing the patching material by a rigid member and then (e) compressing the patching material by an elastic member.

7. A method for mending a naturally occurring defect having a periphery in a wood plate having a surface, comprising the steps of:

a. preparing a solid patching material which is smaller in thicknesswise shear strength and compressive strength than the wood plate and extends laterally beyond the periphery of the defect of the wood plate which is to be mended;
b. positioning the solid patching material between the wood plate and another plate which lie one above the other, in such a manner as to cover the defect with the patching material; and
c. during a step of bonding the two plates by adhesive, compressing the two plates in a thicknesswise direction thereof with a compressive force effective to cause the solid patching material to undergo shear fracture along the periphery of the defect so that a central portion of the patching material which overlies the defect is thrust into and stops up the defect while another part of the patching material, lying outside of the periphery of the defect and outside of the central portion of the patching material, remains on the surface of the wood plate and outside of the defect.

8. A method as claimed in claim 7, wherein the patching material has substantially the same thickness as the wood plate.

* * * * *